US012457519B2

(12) United States Patent
Jain et al.

(10) Patent No.: US 12,457,519 B2
(45) Date of Patent: Oct. 28, 2025

(54) MESSAGE GENERATION BASED ON COMMUNICATION LOSS CORRELATION

(71) Applicant: Adobe Inc., San Jose, CA (US)

(72) Inventors: Ajay Jain, San Jose, CA (US); Eric Kienle, Portland, OR (US)

(73) Assignee: Adobe Inc., San Jose, CA (US)

( * ) Notice: Subject to any disclaimer, the term of this patent is extended or adjusted under 35 U.S.C. 154(b) by 396 days.

(21) Appl. No.: 18/132,163

(22) Filed: Apr. 7, 2023

(65) Prior Publication Data

US 2024/0340686 A1 Oct. 10, 2024

(51) Int. Cl.
*H04W 28/02* (2009.01)

(52) U.S. Cl.
CPC ... *H04W 28/0242* (2013.01); *H04W 28/0236* (2013.01)

(58) Field of Classification Search
CPC ......... H04W 28/0236; H04W 28/0242; H04W 28/0247
USPC ........................................................ 370/329
See application file for complete search history.

(56) References Cited

U.S. PATENT DOCUMENTS

| | | | | |
|---|---|---|---|---|
| 8,868,548 | B2 * | 10/2014 | Kurzion | G06F 16/9535 |
| | | | | 707/723 |
| 11,790,177 | B1 * | 10/2023 | Barrasso | H04M 3/2281 |
| | | | | 704/9 |
| 12,340,316 | B2 * | 6/2025 | Singaraju | G06N 5/041 |
| 2014/0258779 | A1 * | 9/2014 | Kaler | G06F 21/552 |
| | | | | 714/28 |
| 2021/0081819 | A1 * | 3/2021 | Polleri | G06F 16/252 |
| 2021/0097491 | A1 * | 4/2021 | Minyard | G06N 20/00 |
| 2022/0086037 | A1 * | 3/2022 | Géhberger | H04L 41/0654 |
| 2022/0351726 | A1 * | 11/2022 | Coons | G06F 3/167 |

(Continued)

OTHER PUBLICATIONS

Moran, Matt, startupbonsai, "25+ Top Chatbot Statistics for 2023: Usage, Demographics, Trends", Available at https://startupbonsai.com/chatbot-statistics/, Jan. 2, 2023, 16 pages.

(Continued)

*Primary Examiner* — Robert J Lopata
(74) *Attorney, Agent, or Firm* — Kilpatrick Townsend & Stockton LLP (57) ABSTRACT

Certain aspects and features of the present disclosure relate to providing message generation based on communication loss correlation. For example, a method involves detecting a loss of a communication with a communication recipient and parsing content of the communication. The method further involves computing communication-based values for recipient intent attributes corresponding to the communication and action-based values for the recipient intent attributes corresponding to the communication. The method additionally involves correlating the communication-based values and the action-based values for the recipient intent attributes to determine common intent attributes corresponding to the communication recipient. The method also involves generating at least one message configured for the communication recipient based on the common intent attributes. The method can also involve transmitting the at least one message to a target device. Other embodiments include computer systems, apparatus, and computer programs configured to perform the above method or a similar method.

20 Claims, 7 Drawing Sheets

(56) References Cited

U.S. PATENT DOCUMENTS

| | | | | |
|---|---|---|---|---|
| 2023/0089836 A1* | 3/2023 | Srivastava | .............. | H04L 69/18 709/224 |
| 2023/0105806 A1* | 4/2023 | Dunn | ....................... | G06N 3/08 704/9 |
| 2024/0086757 A1* | 3/2024 | Pei | ........................... | G06N 3/09 |
| 2025/0050221 A1* | 2/2025 | Chen | ....................... | A63F 13/67 |

OTHER PUBLICATIONS

Barby, Mathew, "Life Beyond Email: Chatbot Marketing", Available at https://mhb.xyz/essays/chatbot-marketing/, Feb. 14, 2017, 20 pages.

Adobe, Adobe Experience Cloud Blog, "Lead management", Available at https://business.adobe.com/blog/basics/lead-management, Mar. 26, 2021, 9 pages.

Adobe, Adobe Experience Cloud Blog, "Leave no lead behind with advanced lead management", Available at https://business.adobe.com/products/marketo/lead-management.html, 2022, 11 pages.

\* cited by examiner

MESSAGE GENERATION BASED ON COMMUNICATION LOSS CORRELATION

TECHNICAL FIELD

The present disclosure generally relates to messaging, such as might be used communicate information about a product or service. More specifically, but not by way of limitation, the present disclosure relates to statistically based techniques for programmatically generating messages based on abandoned or lost communication.

BACKGROUND

Communication between an enterprise and a user may take the form of live interaction through an application or web site, such as via a chat function where a chatbot or human representative interacts with the user or customer using text or voice. Sometimes, communication is lost without the cause of the loss being readily discernable by enterprise personnel. In such a case, a customer support person or other employee or contractor associated with the enterprise may seek to reestablish communication through one or more messages sent to the user. The term "message" can refer to a text message, email message, push message sent to a mobile or other application, instant message, phone call, or the like. The best way to message the user can be determined by inspection of the records of the enterprise to determine messaging preferences or available messaging channels, and inspection of the communication content prior to the loss to determine the reason for the lost communication.

SUMMARY

Certain aspects and features of the present disclosure relate to providing message generation based on communication loss correlation. For example, a method involves detecting a loss of a communication with a communication recipient and parsing the content of the communication. The method further involves computing, based on the content of the communication, communication-based values for recipient intent attributes corresponding to the communication. The method also involves computing action-based values for the recipient intent attributes corresponding to the communication. The method additionally involves correlating the communication-based values and the action-based values for the recipient intent attributes to determine common intent attributes corresponding to the communication recipient and generating at least one message configured for the communication recipient based on the common intent attributes. The method can also involve transmitting the at least one message to a target device.

Other embodiments include corresponding computer systems, apparatus, and computer programs recorded on one or more computer storage devices, each configured to perform the actions of the above method, a method that involves computing values for the recipient intent attributes for stages of interaction with the communication recipient, or both.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

BRIEF DESCRIPTION OF THE DRAWINGS

Features, embodiments, and advantages of the present disclosure are better understood when the following Detailed Description is read with reference to the accompanying drawings, where:

FIG. 3 is a block diagram illustrating an example of the operation of a software module for providing activity analysis for message generation based on communication loss correlation according to certain embodiments.

DETAILED DESCRIPTION

Communication between an enterprise and a potential customer of the enterprise sometimes takes place as a live interaction through an application or web site, such as via a chat function. If the chat is voice based, the interaction can take place over a smartphone or even using the microphone and speaker of a notebook or desktop computer. Automated bots can enable a company to help potential customers get information or get to know more about a product or service on a "24/7" basis while reducing costs associated with maintaining a live call center.

Bots, whether operating based on word-matching rules or more complex AI algorithms, sometimes do not provide users with the desired information, or otherwise fail to hold the user's interest, resulting in a potential customer closing or leaving the chat interface and either leaving the web site or app altogether, or proceeding on their own to find information using the enterprise's internet resources. Some automated systems that include a chat function can notify enterprise personnel of the "failed" chat, at which point an employee or agent can review the interaction.

When an enterprise employee or agent is notified of the failed chat, the employee or agent can determine if contact information for the user is readily available, and if so, make a decision regarding contacting the user to offer information or otherwise develop the lead represented by the potential customer. This effort requires that personnel spend time conducting these tasks. Decision-making with respect to such contacts can be subjective and unpredictable.

Embodiments described herein address the above issues by automatically correlating a user's behavior data points to computationally assess the user's intent and optimize automatic decisioning as to further communication. When programmatically indicated, a system can automatically generate and dispatch one or more messages to the user in an attempt to re-engage.

The automated use of attributes including, but not limited to, language and content to determine and compute user intent, stitched across various stages of a user's communication provides a system that re-engages with the user when there is enough information available to make the communication likely to succeed. Relevant messages can be generated and dispatched to users without the need for laborious guesswork on the part of support personnel.

For example, an analytics application is executed on a computing system and monitors communication, for example, chat interaction between users of a web site or application server of an enterprise and an entity representing the enterprise. A user may also be referred to herein as a communication recipient. For purposes of the examples herein, it can be assumed that the entity is a chat application. However, embodiments disclosed herein can work with audio chat, as well as with live help over either a chat interface or an audio interface. The analytics application detects loss of communication with the user and in response, parses the content of the communication up until the point of loss.

The analytics application in some examples computes, based on the content, communication-based values for recipient intent attributes. The analytics application can also compute action-based values for the recipient intent attributes. The analytics application then correlates the communication-based values and the action-based values for the intent attributes to determine common intent attributes corresponding to the communication recipient. The analytics application can then generate one or more messages configured for the user based on the common intent attributes and automatically transmitting the message(s) to the user in order to re-engage the user.

The analytics application in some examples computes, in response to the loss of the communication, values for recipient intent attributes corresponding to the communication, wherein the values are computed for a pre-communication stage, a communication stage, and a post-communication stage of interaction with the user. The analytics application can then correlate the values for the recipient intent attributes across the pre-communication stage, the communication stage, and the post-communication stage to determine common intent attributes corresponding to the user.

In some examples, the action-based values for the recipient intent attributes include pre-communication values and post communication values for the recipient intent attributes. The pre-communication values correspond to actions taken by the user prior to the communication and the post communication values correspond to actions taken by the user after the communication has been lost. In some examples, the analytics application assays or determines an interpreted intent corresponding to the user interactions to compute the pre-communication values and post communication values for the recipient intent attributes, and correlation can be carried out between two or three of the sets of values.

In some examples, natural language processing and context computation can be applied to the communication to assay an interpreted intent corresponding to the communication. The interpreted intent and context computation can be used to determine the communication-based values for the recipient intent attributes.

Figure 1:
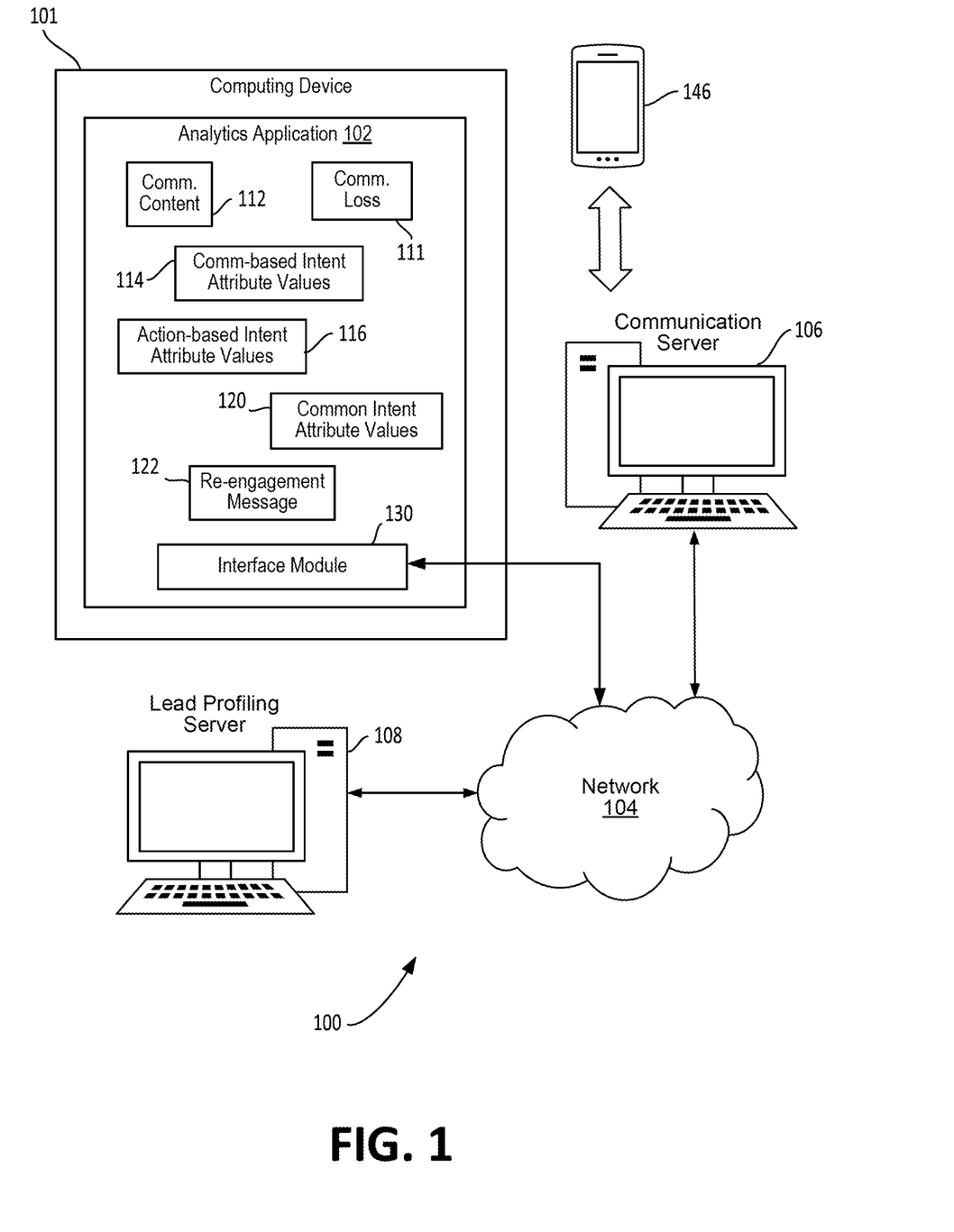
FIG. 1 is a diagram showing an example of a computing environment that provides message generation based on communication loss correlation according to certain embodiments.

FIG. 1 is a diagram showing an example 100 of a computing environment that provides message generation based on communication loss correlation according to certain embodiments. The computing environment 100 includes a computing device 101 that executes an analytics application 102, a communication server 106, and a lead profiling server 108 that is controlled based on the analytics application 102. The communication server 106 is communicatively coupled to computing device 101 using network 104. The lead profiling server 108 is also communicatively coupled to computing device 101 using network 104.

In this example, communication server 106 hosts chat sessions as well as provides transmission capability for relevant messages that can be generated and dispatched to users who have lost communication in order to prompt re-engagement with such users. Communication server 106 may be a messaging server running a messaging application and/or an SMS gateway, a web server, a telecom server, or any other communication server that can host audio to text chat or format and transmit a message under the control of the analytics application 102.

Still referring to FIG. 1, in this example, the analytics application 102 includes the loss flag 111 for indicating a loss of communication with a user. Analytics application 102 also stores a copy of the relevant communication 112 for analysis. Communication-based intent attribute values 114 and action-based intent attribute values 116 are also stored by analytics application 102 and correlated to provide common intent attribute values 120. These common intent attribute values 120 can be used to programmatically generate a re-engagement message 122, which can be sent to communication server 106 via an interface module 130 and network 104. Communication server 106 can then transmit the message to a user computing device 146. User computing device 146 in this example is a mobile device participating in chats using, and receiving message from, communication server 106. Computing device 146 may be connected to the communication server 106 through network 104 or another network. Any or all of computing device 101, communication server 106, or lead profiling server 108 can be implemented as either real or virtual (e.g., cloud-based) computing devices and can be implemented on any number of computing platforms.

Lead profiling server 108 maintains a lead profiling database discussed in further detail below with respect to FIG. 3. Lead profiling server 108 continuously keeps recording user interactions corresponding to each particular user against a specific affinity identifier (ID) assigned to the user. The affinity ID is used to uniquely identify the information in the system for the correlation process for a specific user. Lead profiling server 108 also receives a notice from the analytics application 102 when the communication loss flag is set because a user has abandoned a communication such as a chat that was being carried out by communication server 106. Lead profiling server 108 can accumulate user interaction parameters coming from any of multiple types of client machines and devices such as a mobile device, or a computer, and interactions can be through either a web browser or a dedicated app provided by the enterprise either directly or through an app store.

Figure 2:
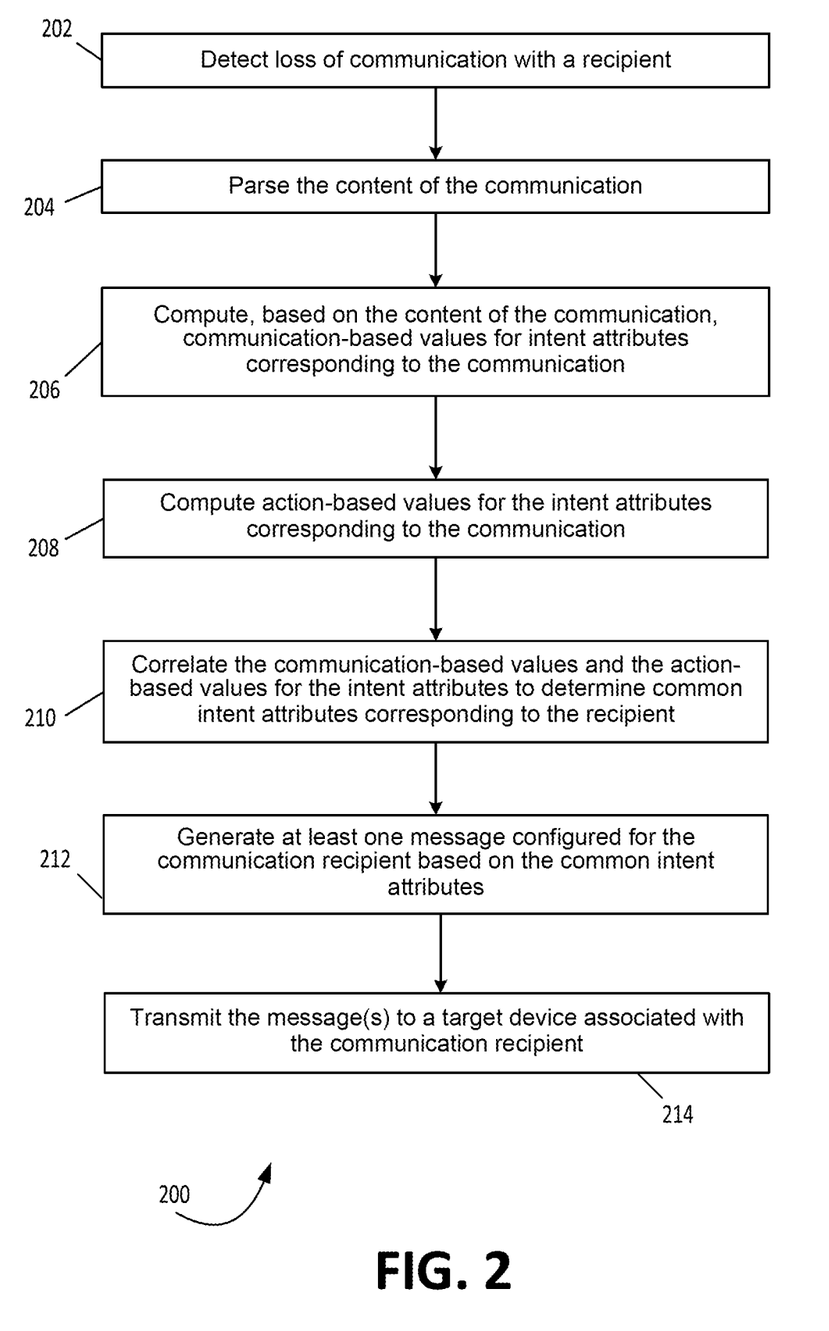
FIG. 2 is a flowchart of an example of a process for providing message generation based on communication loss correlation according to certain embodiments.

FIG. 2 is a flowchart of an example of a process 200 for providing message generation based on communication loss correlation according to certain embodiments. In this example, a computing device carries out the process by executing suitable program code, for example, computer program code for an application, such as analytics application 102. At block 202, the computing device detects a loss of a communication with a user. For example, a chat may be cut off for technical reasons, such as a network or power outage. Alternatively, the user may abandon the communication. As examples, a user may abandon a chat if the user is not satisfied with answers being provided by a chatbot or human agent, or because responses are taking too long. Abandoning a communication may constitute abandoning the pipeline of the enterprise. At block 204, the computing device parses the content of the communication and at block 206, the device computes, based on the content of the communication, communication-based values for recipient intent attributes corresponding to the communication. At block 208, the device computes action-based values for the recipient intent attributes corresponding to the communication.

Communication-based values for recipient intent attributes can be determined from language. For example, words like "price," "purchase," "buy," "color," and the like may indicate an intent to purchase. Action-based values for a similar intent can include values that represent clicking to download a price listing from a web site or clicking to access a "store" page. Intent can be computed using weighted values for word occurrences or actions. For example, an action such as watching a video may be given more weight in determining values than other actions used to determine the action-based values.

Continuing with FIG. 2, at block 210, the computing device correlates the communication-based values and the action-based values for the plurality of recipient intent attributes to determine common intent attributes corresponding to the user. Action-based values for intent attributes can be derived from, as examples, page views, time spent on pages, or if available, browsing history prior to accessing the enterprise's web site. At block 212, the computing device, using the communication server 106, generates at least one message configured for the user based on the common intent attributes. At block 214, the computing device 101, the communication server 106, or both working together, transmit the message or messages to the target device.

Figure 3:
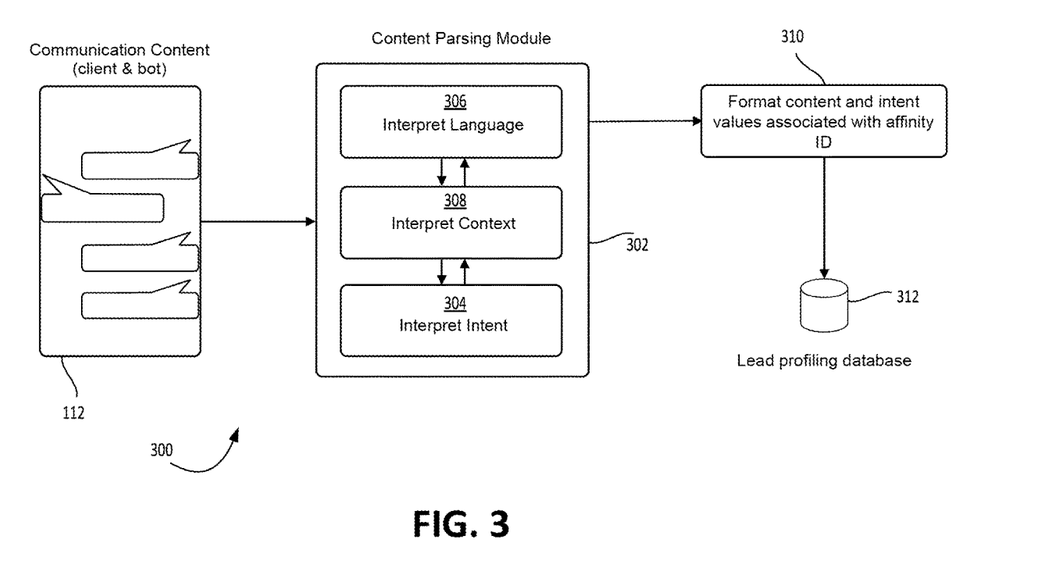
FIG. 3 is a block diagram illustrating an example of the operation of a software module for providing content analysis for message generation based on communication loss correlation according to certain embodiments.
Figure 4:
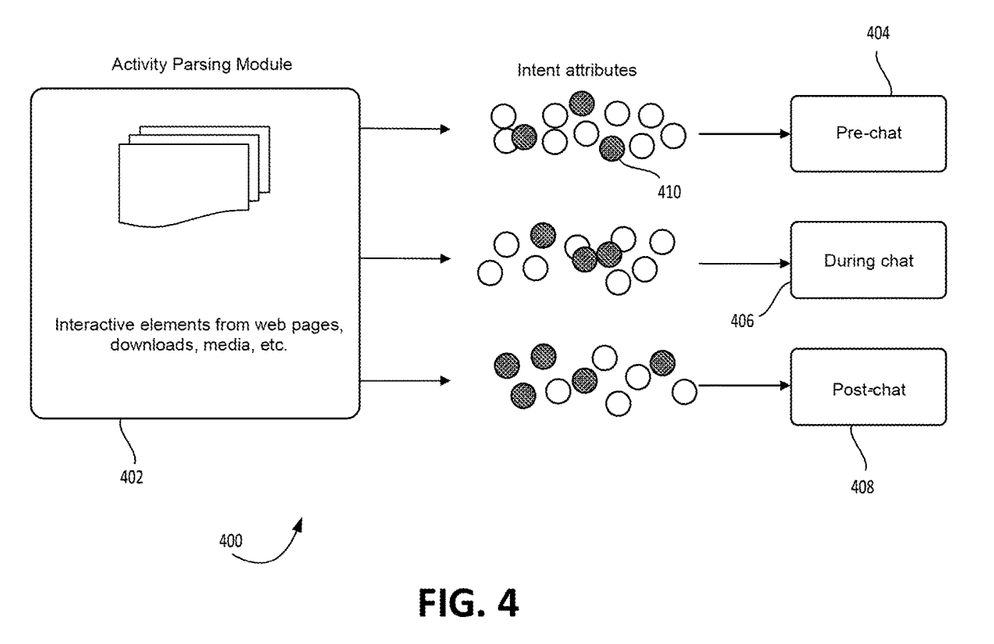
Figure 5:
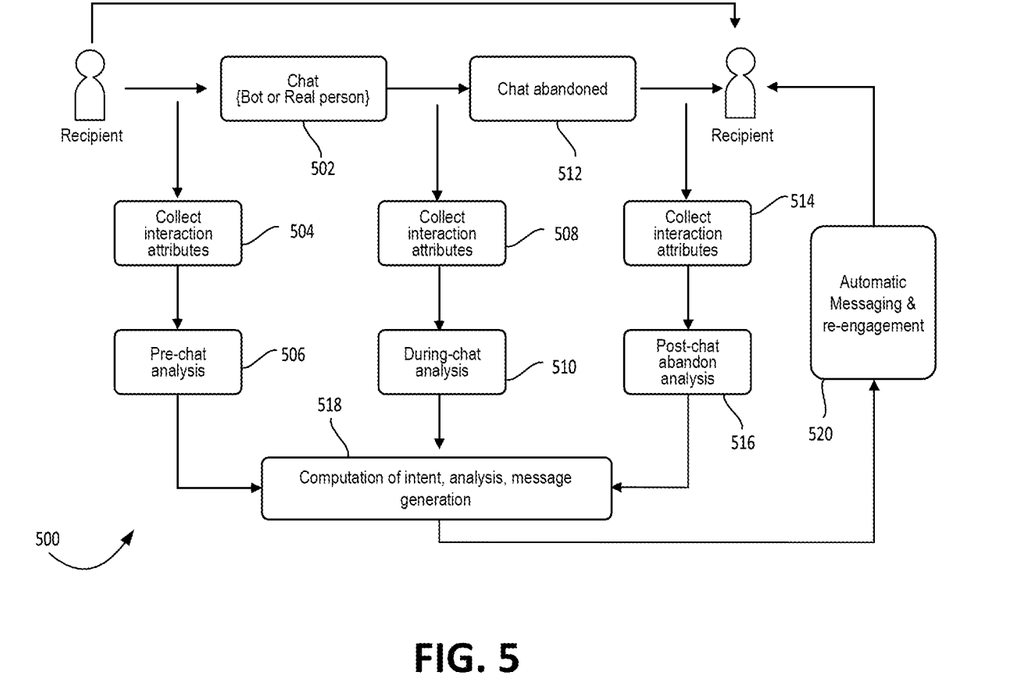
FIG. 5 is a diagram of an example workflow for message generation based on communication loss correlation according to certain embodiments.

For purposes of the examples in FIGS. 3-5, it can be assumed that a text-based chatbot is being used to engage users who are potential customers of an enterprise that is using an embodiment as described herein. Embodiments of this disclosure, however, may also be used with chats using live agents, and may be used with actual voice chats as well as text chats. A user in these examples may also be referred to as a "client" or a "lead." The entity that is responsible for tracking the use may be referred to as the "enterprise" notwithstanding that embodiments may also be used with government and educational organizations; implementations are not restricted to businesses or for-profit entities.

FIG. 3 is a block diagram illustrating an operating example 300 of a software module for providing content analysis for message generation based on communication loss correlation according to certain embodiments. In this example, a potential lead enters a chat-based conversation and during the conversation, the user abandons the chat. As soon as the chat is abandoned, the loss of communication is noted by analytics application 102 using the lost communication flag 111. Communication content 112 in this example includes text-based messages sent by both the client and the bot. Communication content 112 is acted on by content parsing module 302. In this example, content parsing module 302 includes a submodule 304 which interprets intent by working with two other submodules, submodule 306, which interprets language, and submodule 308, which interprets context.

Parsing module 302 in FIG. 3 can use the submodules to the analyze content that the chatbot has sent to the user and the user's responses (or lack of responses) to each of these messages. This analysis can, as an example, make use of historical information such as bot questions and previous users' responses selected from pre-defined menu options, or previous users' responses in free form text. Responses to pre-defined menu options may be based on tree-based, nested option selection, which may be accessed by a navigating user through selecting from the options given by the chatbot.

Continuing with FIG. 3, tree-based responses or free text responses can be linked with the user's responses (e.g., if a user has selected 'yes' for question like "are you looking for a pricing information related to an automobile"). These linked questions and responses are then formatted, intent values are provided at logic block 310, and the information is linked with an affinity ID for the user. These data elements are then sent to the lead profiling database 312, which is maintained by lead profiling server 108. From the interpretation of a user's language and with the underlying context interpretation, both as provided by submodules of content parsing module 302, user's intent is then interpreted by submodule 304 and a value is assigned for storage. User intent directed towards specific information can be linked to user-provided positive responses in the chat when that information was discussed by the bot. For example, when the bot asks questions about pricing terms and the user response positively, or a pricing related document is downloaded by the user from the chat or from the website during the chat. Similarly, if a response to a tree-based pricing question is "no," then the related intent attribute for pricing can be set based on the user's lack of interest, at least for that particular interaction.

FIG. 4 is a block diagram illustrating an operating example 400 of a software module for providing activity analysis for message generation based on communication loss correlation according to certain embodiments. In this example, an activity parsing module 402 captures the user's interactions and associates those interactions with the user's affinity ID. This parsing may include monitoring and recording the user's activities and interactions with the web site of the enterprise. These activities may include, as examples, reading existing documents that were provided to the user by a chatbot and downloaded from the chat interface, search keywords used on the enterprise web site, and watching videos. The activities can include the use of any interactive elements of any web pages visited by the user.

In this example the above, activity capturing begins when the user starts to interact with the enterprise's resources in pre-chat phase 404, continues during chat phase 406, and takes place for some time after the chat in a post-chat phase 408. The action-based values for the recipient intent attributes from before the chat may be referred to herein as pre-communication values. The action-based values for the recipient intent attributes from after the chat may be referred to herein as post communication values. The length of the phase is termed based on a pre-selected limit so that the post-chat analysis, where the user's activities are monitored, can be correlated with the chat, which can be correlated with user interactions before the chat. Activity parsing module 402 can compute the intent of the user over these stages and correlate it with the computed intent from the chat analysis as describe with respect to FIG. 3. The shaded intent attribute values 410 shown in FIG. 4 indicate the common intent attributes identified for the user in the three stages. There may be little or no interaction beyond the chat itself in the during-chat phase 406, in which case action-based intent attribute values may be omitted from the correlation for the during-chat phase, so that only pre-chat and post-chat action-based intent values are used and ultimately correlated with communication-based intent attribute values from the chat phase.

FIG. 5 is a diagram of an example workflow 500 for message generation based on communication loss correlation according to certain embodiments. The workflow correlates the intent for the lead across all three stages, (pre-chat, during-chat and post-chat) and provides associated intent attribute values to the lead profiling database 312. Optionally, based on the communication-based intent attribute values from the abandoned chat 502, the enterprise can be notified regarding values for the user's intent attributes, as well as interest items, which weren't served in time to the user because of the abandoned chat. With or without such a notification, in the example of FIG. 5, interaction attribute values are collected at block 504 and subjected to pre-chat analysis at block 506. For purposes of this disclosure, all attribute values collected across all stages of the interaction can be treated as corresponding to the communication. Communication-based values are based on the language of the communication. Action-based values are based on other interactions. Attribute values collected before and after the communication are necessarily action-based. Either or both types of values can be collected during the communication stage.

Continuing with FIG. 5, interaction attribute values are collected at block 508 and subjected to during-chat analysis at block 510. The during-chat analysis can include communication-based intent attributes, or both communication-based and action-based intent attributes. The chat abandonment is detected at block 512. Interaction attribute values are collected at block 514 and subjected to post-chat analysis at block 516. Computation of intent attribute values, analysis and correlation takes place at block 518, and stored material can be used as a reference in this example to form messaging to the user's device(s) for re-engagement at block 520. Messaging can include, but is not limited to, pop-up messages, mobile notifications, in-app notifications, push messages, as well as email notifications. In-app notification may include invoking pop-up messages to the user when the user is accessing a web site, or within a document app or a video app through an omnichannel approach. Sequence and timing of notifying a user can be configured to enable enterprise systems to learn from a user's chat abandonment by using attributes that describe why the user left the chat and what the user searched for or accessed after abandoning the chat.

Figure 6:
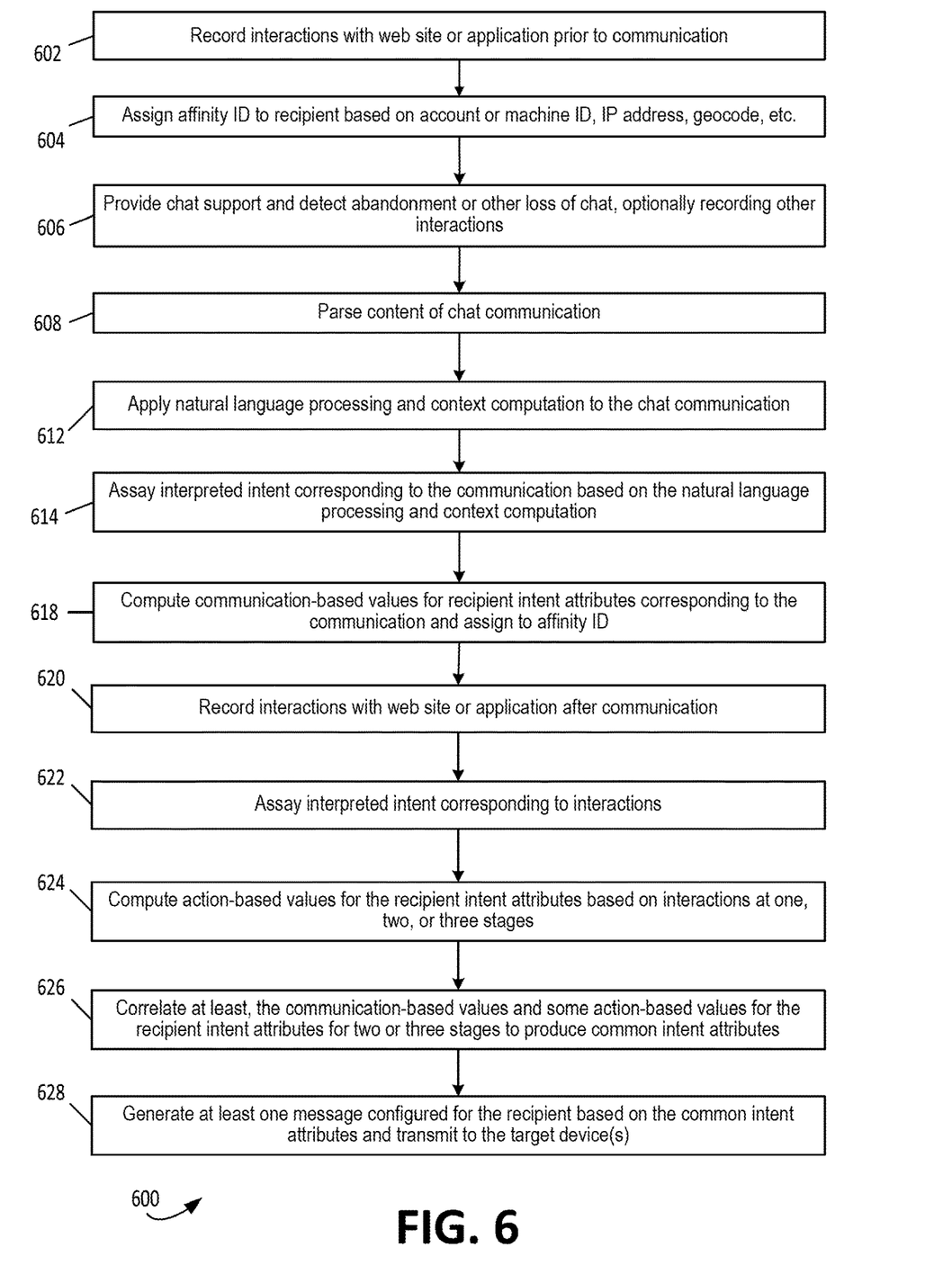
FIG. 6 is a flowchart of another example of a process for providing message generation based on communication loss correlation according to certain embodiments.

FIG. 6 is a flowchart of another example of a process 600 for providing message generation based on communication loss correlation according to certain embodiments. In this example, one or more computing devices carry out the process by executing suitable program code. For example, computing device 101 may carry out the process by executing analytics application 102. Either or both of the communication server 106 or the lead profiling server 108, as another example, may also carry out some operations of process 600.

At block 602 of FIG. 6, the computing device records user interactions with the web site or application of the enterprise prior to the chat communication. At block 604, the computing device assigns an affinity ID to the user. For a logged-in user, an account identifier is known, for example, a user name or other credential. The affinity ID can be based on the user account information. Otherwise, for an anonymous user, an affinity ID can be created based on one or more of a machine ID, an internet protocol (IP) address, a geocode, or other information discernable from the connection between the user and the enterprise's servers. An affinity ID can be used to record the use of the enterprise's resources, for example when the user visits the enterprise's web site and starts building a journey through various stages of an interaction. The affinity ID may be assigned to interactions by this user with respect to enterprise resources such as web sites, online documents, online videos, etc.

At block 606 of FIG. 6, a chat takes place. The computing device provides chat support and records chat interactions, for example, as chat communication content 112. The computing device detects abandonment or other loss of the chat communication. In some examples, as soon as a user abandons a chat, a notification is sent to lead profiling server 108, along with the affinity ID. The computing device optionally records other user interactions that take place during the chat prior to such abandonment, such as the downloading or viewing of documents, or interaction with other interactive elements of the web site or application. Interactions by the user, at all stages, are sent to the lead profiling server 108, which can continuously record the user's interaction against the affinity ID.

Continuing with FIG. 6, the computing device parses the content of the chat communication at block 608. At block 612, the computing device applies natural language processing and context computation to the stored chat communication. At block 614, the computing device assays interpreted intent corresponding to the communication. The interpreted intent can be computationally discerned based on the result of natural language processing and context computation. At block 618, communication-based values for recipient intent attributes corresponding to the communication are computed and assigned to the affinity ID.

Free form text responses can be paired with each asked question or prompt provided by the chatbot. Each response can be processed by a natural language processing module or library so that the text, even if open-ended, can be interpreted. Such natural language processing can make use of a semantic model. Certain attributes of user's interaction, for example, a particular web page that was being viewed when the user accepted or initiated the chat or related responses provided by the user prior to the question or prompt in which user responded, can be analyzed and the context can be computed. Using the context and both open-ended and closed responses, the user's intent can be derived, for example, by a keyword matching operation. A natural language processing module can also analyze tone. A tuple of questions, responses, and context is then sent to the lead profiling server 108 along with the affinity ID assigned to the user.

Correlation can take place both between action-based and communication-based values of recipient intent attributes and across the stages of interaction as described above with respect to FIG. 5. It may be that for certain users or certain communication scenarios, correlation between stages is poor or correlation between action-based and communication-based attribute values is poor at least in certain stages. In one example implementation, a system can search for correlation across all three stages of both kinds of attribute values, and if such a correlation is nonexistent or below a preset threshold, the correlation scope can be reduced. For example, correlation can be determined next between the communication-based values, the pre-communication action-based values, and the post communication action-based values for the recipient intent attributes to produce common recipient intent attributes. If correlation is again poor or nonexistent, two stages can be used. For example, correlation can be processed for any two of the communication-based values, the pre-communication values (action-based), and the post communication values (action-based) to produce common recipient intent attributes. If correlation is still lacking, the system can default to determining user intent based on a single stage or based on only communication-based values or action-based values.

Staying with FIG. 6, at block 620, the computing device records post-communication user interactions with the web site or application that is being accessed. At block 622, the computing device assays interpreted intent corresponding to the user interactions both prior to the chat and post chat. The computing device may also assay interpreted intent for user interactions that take place during the chat. The term "user interactions" in this content refers to actions other than participating in language-based communication during the chat. At block 624, action-based values are computed for the recipient intent attributes based on user interactions at one, two, or three stages, for example, the stages discussed with respect to FIG. 4 and FIG. 5. At block 626, the computing device correlates, at least, the communication-based values and some action-based values for the recipient intent attributes for two or three stages to produce common recipient intent attributes. For example, the computing device may attempt to correlate three stages, and if unsuccessful, may then correlate two stages. The functions included in block 618 and blocks 622 through 626 and discussed with respect to FIG. 6 can be used in implementing a step for determining common intent attributes corresponding to the user based on communication-based values and action-based values for a plurality of recipient intent attributes. At block 628, the computing device generates at least one message configured for the user based on the common intent attributes and transmit that message to the target device(s).

Figure 7:
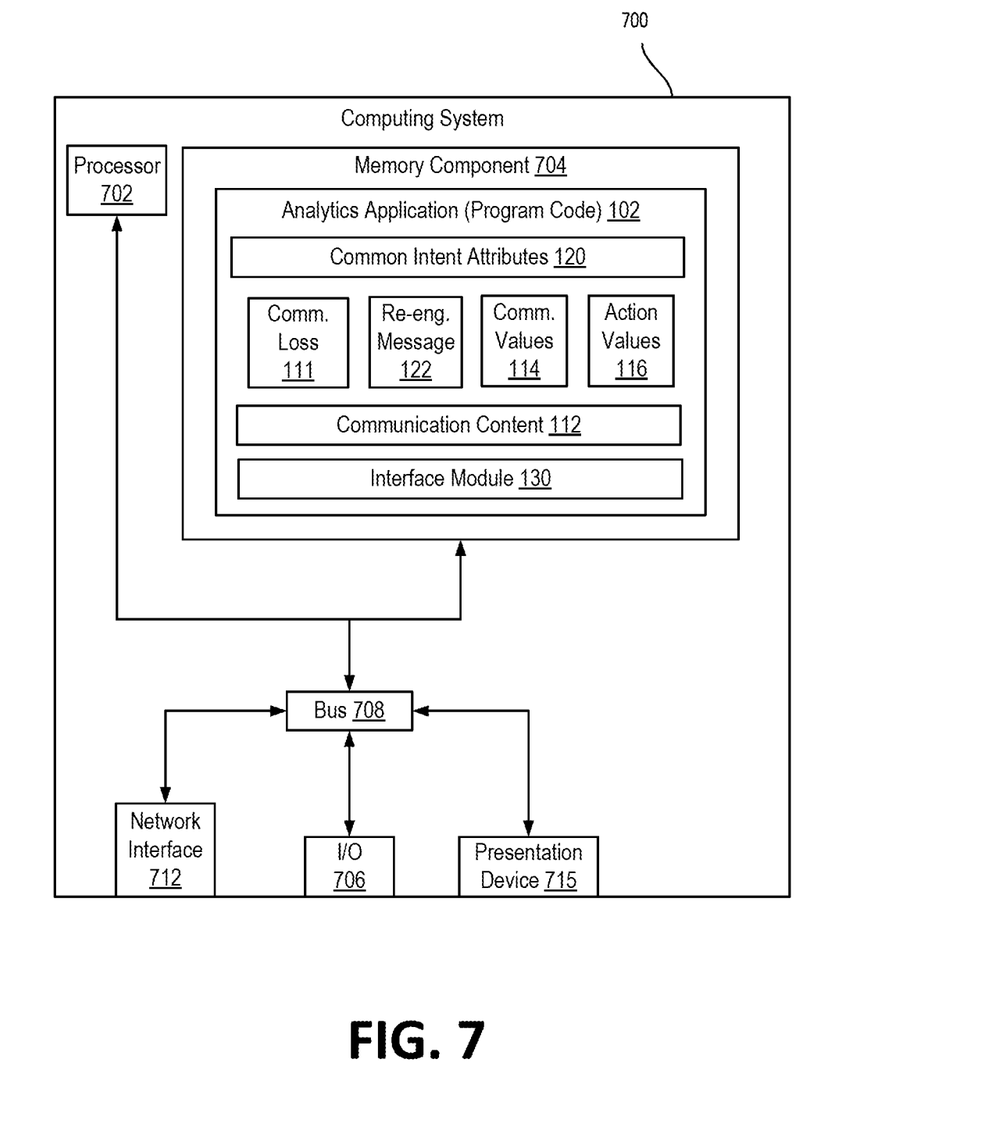
FIG. 7 is a diagram of an example of a computing system that provides message generation based on communication loss correlation according to certain embodiments.

FIG. 7 is a diagram of an example of a computing system that provides message generation based on communication loss correlation according to certain embodiments. System 700 includes a processing device 702 communicatively coupled to one or more memory devices. The processing device 702 executes computer-executable program code stored in the memory component 704. Examples of the processing device 702 include a microprocessor, an application-specific integrated circuit ("ASIC"), a field-programmable gate array ("FPGA"), or any other suitable processing device. The processing device 702 can include any number of processing devices, including a single processing device. The memory component 704 includes any suitable non-transitory computer-readable medium for storing data, program code instructions, or both. A computer-readable medium can include any electronic, optical, magnetic, or other storage device capable of providing a processor with computer-readable, executable instructions or other program code. The memory component can include multiple memory devices to provide a computer-readable medium. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, and JavaScript.

Still referring to FIG. 7, the computing system 700 may also include a number of external or internal devices, for example, input or output devices. For example, the computing system 700 is shown with one or more input/output ("I/O") interfaces 706. An I/O interface 706 can receive input from input devices or provide output to output devices (not shown). One or more buses 708 are also included in the computing system 700. A bus 708 communicatively couples one or more components of a respective one of the computing system 700. The processing device 702 executes program code that configures the computing system 700 to perform one or more of the operations described herein. The program code includes, for example, analytics application 102 or other suitable applications that perform one or more operations described herein. The program code may be resident in the memory component 704 or any suitable computer-readable medium and may be executed by the processing device 702 or any other suitable processor. Memory component 704, includes communication-based values 114, common intent attributes 120, communication loss flag 111, communication content 112, re-engagement message 122, and action-based values 116.

The system 700 of FIG. 7 also includes a network interface device 712. The network interface device 712 includes any device or group of devices suitable for establishing a wired or wireless data connection to one or more data networks. Non-limiting examples of the network interface device 712 include an Ethernet network adapter, a wireless network adapter, and/or the like. The system 700 is able to communicate with one or more other computing devices (e.g., another computing device executing other software, not shown) via a data network (not shown) using the network interface device 712. Network interface device 712 can also be used to communicate with the communication server 106 and lead profiling server 108.

Staying with FIG. 7, in some embodiments, the computing system 700 also includes the presentation device 715. A presentation device 715 can include any device or group of devices suitable for providing visual, auditory, or other suitable sensory output. In examples, presentation device 715 provides the dynamic statistics being processed, or notifications of abandoned communications occurring on an enterprise's systems. Non-limiting examples of the presentation device 715 include a touchscreen, a monitor, a separate mobile computing device, etc. In some aspects, the presentation device 715 can include a remote client-computing device that communicates with the computing system 700 using one or more data networks. System 700 may be implemented as a unitary computing device, for example, a notebook or mobile computer. Alternatively, as an example, the various devices included in system 700 may be distributed and interconnected by interfaces or a network with a central or main computing device including one or more processors.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "generating," "assaying," "processing," "computing," "accessing," and "determining" or the like refer to actions or processes of a computing device, such as one or more computers or a similar electronic computing device or devices that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general-purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "configured to" or "based on" herein is meant as open and inclusive language that does not foreclose devices adapted to or configured to perform additional tasks or steps. The endpoints of comparative limits are intended to encompass the notion of quality. Thus, expressions such as "more than" should be interpreted to mean "more than or equal to."

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation and does not preclude inclusion of such modifications, variations, and/or additions to the present subject matter as would be readily apparent to one of ordinary skill in the art.

What is claimed is:

1. A method comprising:
   detecting a loss of a communication with a communication recipient;
   parsing content of the communication;
   computing, based on the content of the communication, communication-based values for a plurality of recipient intent attributes corresponding to the communication;
   computing action-based values for the plurality of recipient intent attributes corresponding to the communication;
   correlating the communication-based values and the action-based values for the plurality of recipient intent attributes to determine common intent attributes corresponding to the communication recipient;
   generating at least one message configured for the communication recipient based on the common intent attributes; and
   transmitting the at least one message to a target device corresponding to the communication recipient.

2. The method of claim 1, wherein the action-based values for the plurality of recipient intent attributes further comprise at least one of pre-communication values or post communication values for the plurality of recipient intent attributes.

3. The method of claim 2, further comprising:
   recording interactions with a web site or an application prior to and after the communication; and
   assaying an interpreted intent corresponding to the interactions to compute the pre-communication values and post communication values for the plurality of recipient intent attributes.

4. The method of claim 2, wherein correlating the communication-based values and the action-based values for the plurality of recipient intent attributes further comprises:
   correlating the communication-based values, the pre-communication values, and the post communication values for the plurality of recipient intent attributes to produce common recipient intent attributes; and
   correlating any two of the communication-based values, the pre-communication values, and the post communication values to produce common recipient intent attributes when no common recipient intent attributes result from correlating the communication-based values, the pre-communication values, and the post communication values.

5. The method of claim 1, further comprising:
   assigning an affinity ID to the communication recipient based on an interaction with the communication recipient prior to the communication; and
   using the affinity ID to compute the action-based values and the communication-based values for the plurality of recipient intent attributes.

6. The method of claim 5, wherein the affinity ID includes at least two of a machine identifier, a geocode, and an internet protocol address for anonymous communication recipients or an account identifier for logged-in communication recipients.

7. The method of claim 1, further comprising:
   applying natural language processing and context computation to the communication; and
   assaying an interpreted intent corresponding to the communication based on the natural language processing and the context computation to compute the communication-based values for the plurality of recipient intent attributes.

8. A system comprising:
   a memory component; and
   a processing device coupled to the memory component to perform operations comprising:
      detecting a loss of a communication with a communication recipient;
      computing, in response to the loss of the communication, values for a plurality of recipient intent attributes corresponding to the communication, wherein the values are computed for a pre-communication stage, a communication stage, and a post-communication stage of interaction with the communication recipient;

correlating the values for the plurality of recipient intent attributes across the pre-communication stage, the communication stage, and the post-communication stage to determine common intent attributes corresponding to the communication recipient;

generating at least one message configured for the communication recipient based on the common intent attributes; and transmitting the at least one message to a target device corresponding to the communication recipient.

9. The system of claim 8, wherein the values for the plurality of recipient intent attributes further comprise action-based values and communication-based values for the plurality of recipient intent attributes.

10. The system of claim 9, wherein the operations further comprise:

recording communication recipient interactions with a web site or an application; and assaying an interpreted intent corresponding to the communication recipient interactions to compute the action-based values for the plurality of recipient intent attributes.

11. The system of claim 9, wherein the operation of correlating the values for the plurality of recipient intent attributes further comprises:

correlating communication-based values, pre-communication values, and post communication values for the plurality of recipient intent attributes to produce the common recipient intent attributes; and correlating any two of the communication-based values, the pre-communication values, and the post communication values to produce the common intent attributes when no common intent attributes result from correlating the communication-based values, the pre-communication values, and the post communication values.

12. The system of claim 8, wherein the operations further comprise:

assigning an affinity ID to the communication recipient based on an interaction with the communication recipient prior to the communication; and using the affinity ID to compute the values for the plurality of recipient intent attributes.

13. The system of claim 12, wherein the affinity ID includes at least two of a machine identifier, a geocode, and an internet protocol address for anonymous communication recipients or an account identifier for logged-in communication recipients.

14. The system of claim 8, wherein the operations further comprise:

applying natural language processing and context computation to the communication; and assaying an interpreted intent corresponding to the communication based on the natural language processing and the context computation to compute at least some of the values for the plurality of recipient intent attributes.

15. A non-transitory computer-readable medium storing executable instructions, which when executed by a processing device, cause the processing device to perform operations comprising:

detecting a loss of a communication with a communication recipient;

parsing content of the communication;

a step for determining common intent attributes corresponding to the communication recipient based on communication-based values and action-based values for a plurality of recipient intent attributes;

generating at least one message configured for the communication recipient based on the common intent attributes; and transmitting the at least one message to a target device corresponding to the communication recipient.

16. The non-transitory computer-readable medium of claim 15, wherein the action-based values for the plurality of recipient intent attributes further comprise at least one of pre-communication values or post communication values for the plurality of recipient intent attributes.

17. The non-transitory computer-readable medium of claim 16, wherein the executable instructions further cause the processing device to perform operations comprising:

recording communication recipient interactions with a web site or an application prior to and after the communication; and assaying an interpreted intent corresponding to the communication recipient interactions to compute the pre-communication values and post communication values for the plurality of recipient intent attributes.

18. The non-transitory computer-readable medium of claim 15, wherein the executable instructions further cause the processing device to perform operations comprising:

assigning an affinity ID to the communication recipient based on an interaction with the communication recipient prior to the communication; and using the affinity ID to compute the action-based values and the communication-based values for the plurality of recipient intent attributes.

19. The non-transitory computer-readable medium of claim 18, wherein the affinity ID includes at least two of a machine identifier, a geocode, and an internet protocol address for anonymous communication recipients or an account identifier for logged-in communication recipients.

20. The non-transitory computer-readable medium of claim 15, wherein the executable instructions further cause the processing device to perform operations comprising:

applying natural language processing and context computation to the communication; and assaying an interpreted intent corresponding to the communication based on the natural language processing and the context computation to compute the communication-based values for the plurality of recipient intent attributes.

\* \* \* \* \*